United States Patent
Albright

(12) 
(10) Patent No.: US 6,553,979 B2
(45) Date of Patent: Apr. 29, 2003

(54) PRESSURE-REGULATING PISTON WITH BUILT-IN RELIEF VALVE

(75) Inventor: John E Albright, Hackettstown, NJ (US)

(73) Assignee: ASCO Controls, LP, Florham Park, NJ (US)

( * ) Notice: Subject to any disclaimer, the term of this patent is extended or adjusted under 35 U.S.C. 154(b) by 0 days.

(21) Appl. No.: 09/866,515

(22) Filed: May 25, 2001

(65) Prior Publication Data

US 2002/0050292 A1 May 2, 2002

Related U.S. Application Data

(60) Provisional application No. 60/207,079, filed on May 25, 2000.

(51) Int. Cl.[7] .................................................. G05D 7/00
(52) U.S. Cl. ..................................... 123/574; 137/505.11
(58) Field of Search ................................. 123/572, 573, 123/574; 137/505.11, 907

(56) References Cited

U.S. PATENT DOCUMENTS

| | | | | |
|---|---|---|---|---|
| 3,906,982 A | | 9/1975 | Fleischhacker et al. .. | 137/116.5 |
| 4,279,746 A | | 7/1981 | Leutz .......................... | 210/130 |
| 4,607,604 A | * | 8/1986 | Kanoh et al. ................ | 123/572 |
| 4,760,833 A | | 8/1988 | Tatyrek ....................... | 123/574 |
| 5,086,807 A | * | 2/1992 | Lasnier et al. ......... | 137/505.11 |
| 5,307,834 A | | 5/1994 | Tatarek-Gintowt et al. ...................... | 137/505.11 |
| 5,479,907 A | * | 1/1996 | Walker, Jr. ................... | 123/573 |
| 5,564,401 A | | 10/1996 | Dickson ...................... | 123/573 |
| 5,669,366 A | | 9/1997 | Beach et al. ................. | 123/572 |
| 5,722,376 A | | 3/1998 | Sweeten ....................... | 123/574 |
| 5,732,735 A | * | 3/1998 | Birch ..................... | 137/505.11 |
| 6,068,762 A | | 5/2000 | Stone et al. .................. | 210/90 |

OTHER PUBLICATIONS

Parker Hannifin Corporation Web site, http://www.parker.com, dated Feb. 24, 2000 (15 pages).

* cited by examiner

Primary Examiner—Marguerite McMahon
(74) Attorney, Agent, or Firm—Howrey Simon Arnold & White, LLP

(57) ABSTRACT

A pressure-regulating valve particularly useful in a diesel internal combustion engine with a closed crankcase is provided. The valve includes a body coupled to a bonnet with an internal movable piston. The movable piston maintains a substantially constant pressure in the crankcase by adjusting a fluid flow in response to changes in pressure. The movable piston also includes an integral relief valve to prevent overpressure in the event of a crankcase pressure in excess of the designed limits of the pressure-regulating valve.

9 Claims, 5 Drawing Sheets

PRESSURE-REGULATING PISTON WITH BUILT-IN RELIEF VALVE

CROSS-REFERENCE TO RELATED APPLICATIONS

This Application claims priority of the Provisional Application No. 60/207,079 filed May 25, 2000.

FIELD OF THE INVENTION

This invention relates generally to engine valve apparatus and, more particularly, to a pressure regulating piston valve with a built in relief valve.

BACKGROUND OF THE INVENTION

As engine manufacturers reduce exhaust emissions, crankcase blow-by vented to the atmosphere has become a larger contributor to the total emissions. Crankcase blow-by is produced when combustion gases, under high pressure, become contaminated with oil mist when blown past the piston rings into the crankcase. To further reduce the total emissions of engines, it has become necessary to rout these gases into the air intake system. In a closed system, this contaminated blow-by is ingested by the engine intake system.

Interest in closed crankcases is being driven both by regulatory as well as operating concerns. As of Jan. 1, 1998, the U.S. Environmental Protection Agency (EPA) required that all gaseous-fueled on-highway engines must have a closed crankcase. While there are as yet no specific regulations on closing the crankcases of diesel engines, the overall drive to reduce emissions has made most engine and equipment manufacturers become more interested in closing their crankcases.

In a closed crankcase system, crankcase blow-by gases, which inherently cause a rise in crankcase pressure, need to be routed back into the engine intake system. Excessive variations in crankcase pressure can damage seals and cause a loss of oil. There is a perceived need for a pressure regulator to minimize variation in crankcase pressure. There is also a perceived need for a relief valve to protect against overpressure in the crankcase that cannot be compensated for by the regulator itself.

The present invention is directed to overcoming, or at least reducing the effects of, one or more of the issues set forth above.

SUMMARY OF THE INVENTION

One aspect of the present invention provides a pressure-regulating valve, including a body, a movable piston, and a relief valve. The body has a fluid passageway therethrough. The movable piston is disposed within the body and is movable in response to pressures thereon to adjust a fluid flow through the fluid passageway. The relief valve is integral to the piston. At least one hole in the piston is exposed to a relief passageway upon the application of a predetermined level of pressure on the piston.

Another aspect of the present invention provides a pressure-regulating valve, including an upper body portion, a lower body portion, a movable piston and a spool. The upper body portion is in fluid communication with a crankcase. The lower body portion isolated fluidly from the upper body portion and having a lower body fluid passageway therethrough in communication with a crankcase and a vacuum source. The movable piston is disposed within the upper body portion. The piston is movable in response to pressure thereon to adjust a fluid flow through the lower body fluid passageway. The spool connected to the piston and extending through the upper body portion and to the lower body portion.

Yet another aspect of the present invention provides a method of regulating pressure in a crankcase of an internal combustion engine. The method includes providing a crankcase valve responsive to crankcase pressure, wherein changes in crankcase pressure are communicated to the crankcase valve; adjusting a flow through the crankcase valve to correspondingly alter the crankcase pressure; and releasing overpressure in the crankcase through a relief valve integral to the crankcase valve upon application of a predetermined amount of pressure.

The foregoing summary is not intended to summarize each potential embodiment or every aspect of the invention disclosed herein, but merely to summarize the appended claims.

BRIEF DESCRIPTION OF THE DRAWINGS

The foregoing summary, preferred embodiments and other features or aspects of the invention will become apparent upon reading the following detailed description and upon reference to the drawings, in which.

Figure 1:
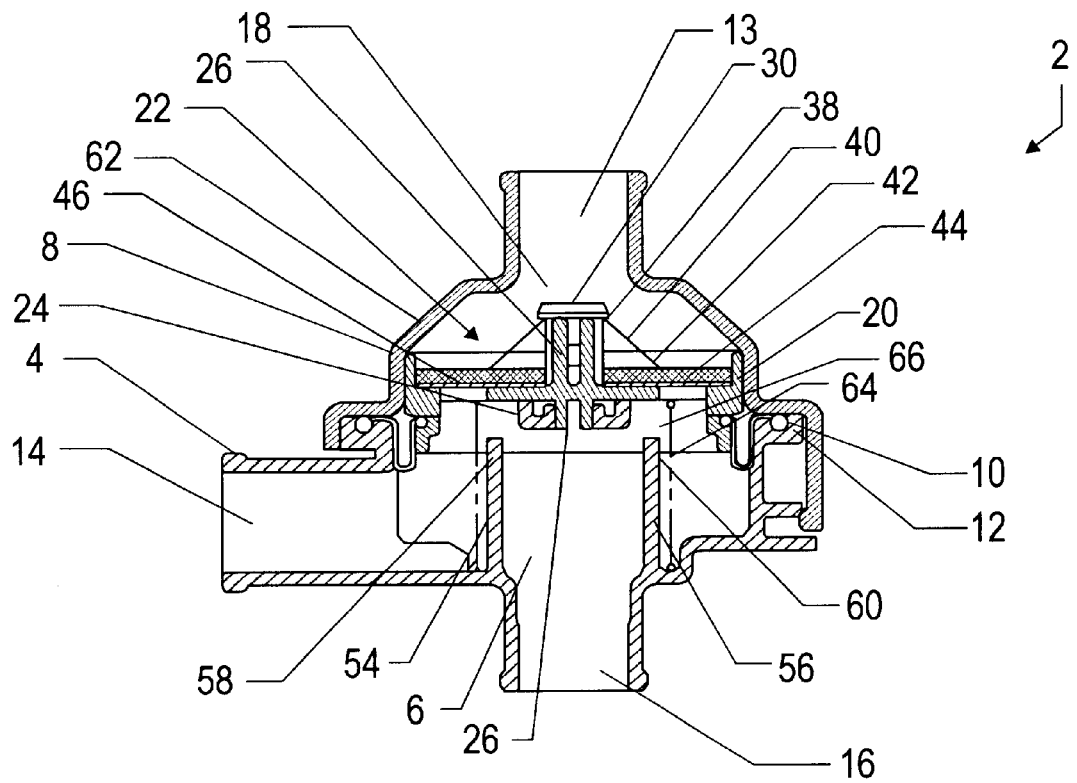
FIG. 1 is a cross-sectional view of a valve design in accordance with one aspect of the invention.

While the invention is susceptible to various modifications and alternative forms, specific embodiments thereof have been shown by way of example in the drawings and are herein described in detail. The figures and written description are not intended to limit the breadth or scope of the invention in any manner, rather they are provided to illustrate the invention to a person of ordinary skill in the art by reference to particular embodiments of the invention, as required by 35 USC § 112.

DETAILED DESCRIPTION OF THE INVENTION

Figure 2:
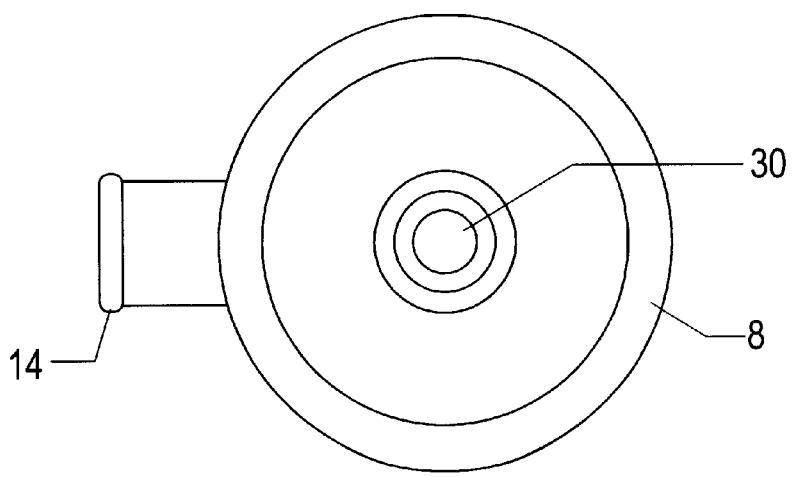
FIG. 2 is a top view of the design according to FIG. 1.

Turning now to the figures, and in particular to FIG. 1, a pressure-regulating valve 2 in accordance with one embodiment of the invention is disclosed. Pressure regulating valve 2 may be used in equipment including, but not limited to, gas engines, diesel engines, generator sets and other power equipment. As shown in FIG. 1, pressure-regulating valve 2 includes a body 4 with a fluid passageway 6 extending therethrough. Fluid passageway 6 may facilitate, for example, fluid communication between a crankcase (not shown) and a vacuum source (not shown). In the embodiment shown in FIG. 2, fluid passageway 6 exhibits an inlet 14 and an outlet 16 that are substantially normal to one another, but this is not necessarily so. In other embodiments discussed in more detail later in this disclosure the inlet 14 and outlet 16 are arranged parallel to one another. It will be understood by one of skill in the art with the benefit of this disclosure that inlet 14 and outlet 16 may be arranged in any convenient manner. In the embodiment of FIG. 1, use of pressure regulating valve 2 is integrated into a diesel engine (not shown) with a closed crankcase to facilitate reduced emissions.

Attached to body 4 is a bonnet 8. A diaphragm 10, preferably a rolling diaphragm such as is available from Bellofram, Inc., is disposed between body 4 and bonnet 8. Rolling diaphragm 10 fits into a groove 12 formed in body 4 and provides a gas-tight seal between body 4 and bonnet 8. Bonnet 8 includes a relief flow passageway 13 isolated from fluid passageway 6 in normal operation. Relief flow passageway 13 may lead directly to atmosphere, or it may lead back to an engine intake manifold (not shown).

Figure 5:
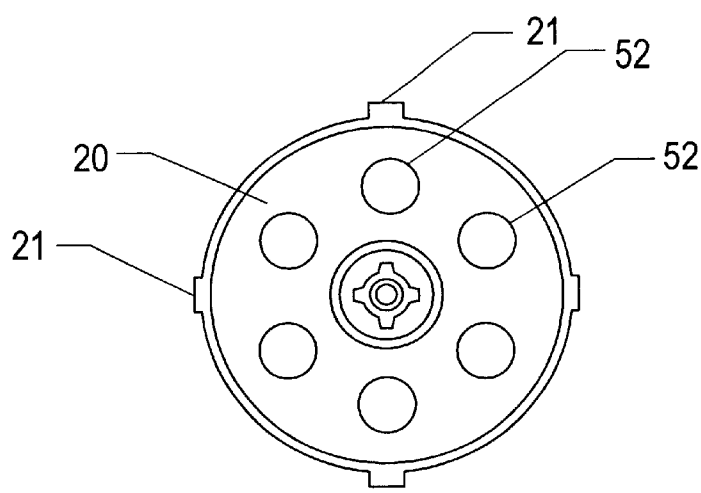
FIG. 5 is a top view of a valve piston in accordance with one aspect of the invention.
Figure 6:
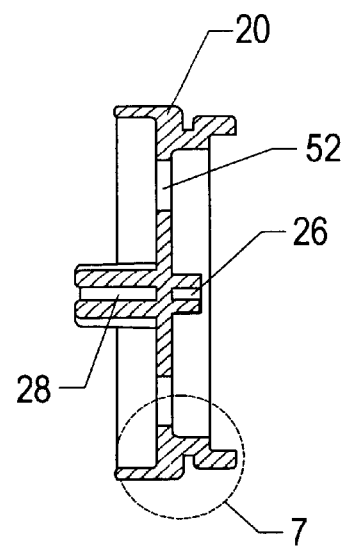
FIG. 6 is a cross-sectional view of the design according to FIG. 5.
Figure 7:
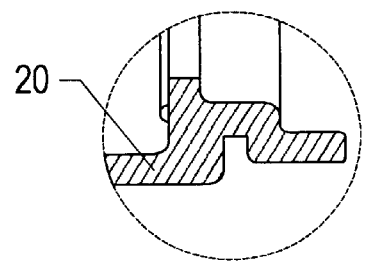
FIG. 7 is a detail of the circled area of FIG. 6.
Figure 8:
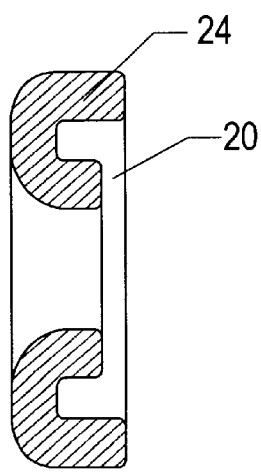
FIG. 8 is a cross-sectional view of a flow shaper design according to the invention.
Figure 9:
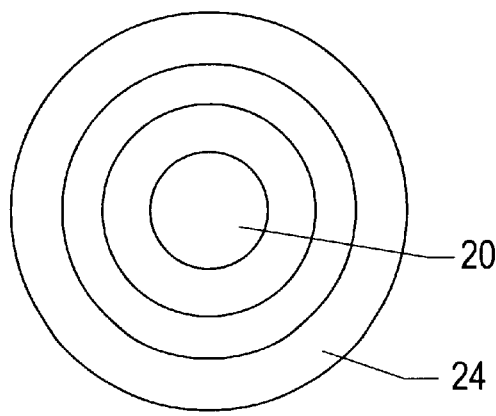
FIG. 9 is a top view of the design according to FIG. 8.
Figure 10:
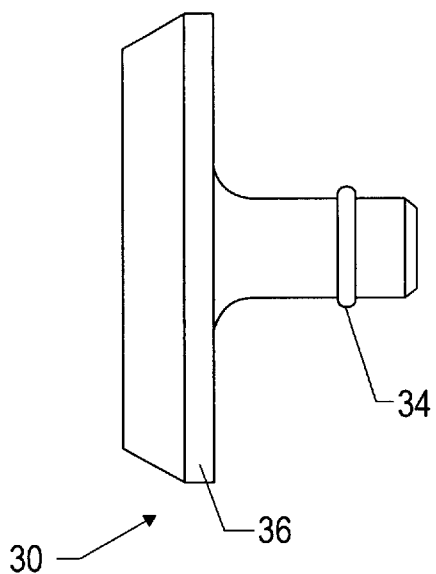
FIG. 10 is a side view of a plug in accordance with the invention.
Figure 11:
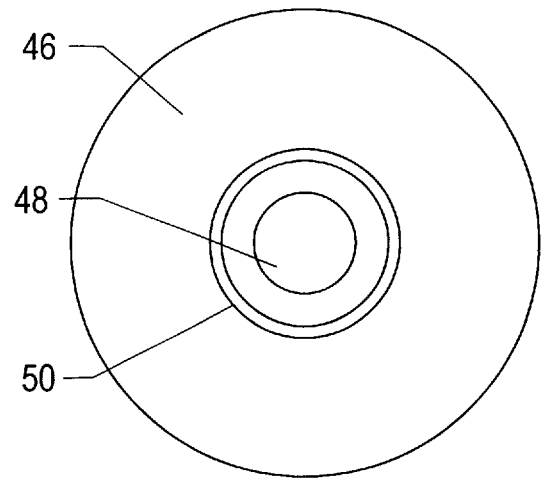
FIG. 11 is a top view of a relief disc design in accordance with the invention.
Figure 12:
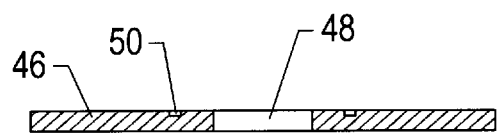
FIG. 12 is a cross-sectional view of the relief disc shown in FIG. 11.

A movable piston assembly 18 is disposed inside body 4 and bonnet 8. Piston assembly 18 includes a piston 20 that is also part of an integrated relief valve 22. Piston 20 includes at least one hole, for example the six holes 52 equally spaced around the circumference of the piston as shown in FIG. 5. Piston 20 includes at least one guide/stop leg, for example the four guides/stops 21 equally spaced around the circumference of the piston as shown in FIG. 5, to guide piston 20 inside bonnet 8 and to stop piston travel on angled wall 62 of bonnet 8. Piston 20 is shown in some detail in FIGS. 5–7. Piston assembly 18 may also include a flow shaper 24 attached to a nipple 26 of piston 20. Flow shaper 24 is shown in some detail on FIGS. 8 and 9. Flow shaper 24 may have a generally U-shaped cross-section and facilitates less turbulent flow through fluid passageway 6. Opposite nipple 26 of piston 20 is a channel 28 receptive of a plug 30. Plug 30 is shown in detail on FIG. 10 and includes a stem 32 with a raised portion(s) 34 to facilitate attachment to piston 20. A head 36 of plug 30 retains a first end 38 of a biasing member, such as a conical spring 40. Conical spring 40 exhibits a second end 42 that abuts relief disc 46. Relief disk 46 is shown in detail in FIGS. 11 and 12 and includes a hole 48 to accommodate piston channel 28 and includes a groove 50 into which a second end 42 of conical spring 40 fits. Relief disk 46 may comprise, but it not limited to, Ryton R-4XT.

Figure 13:
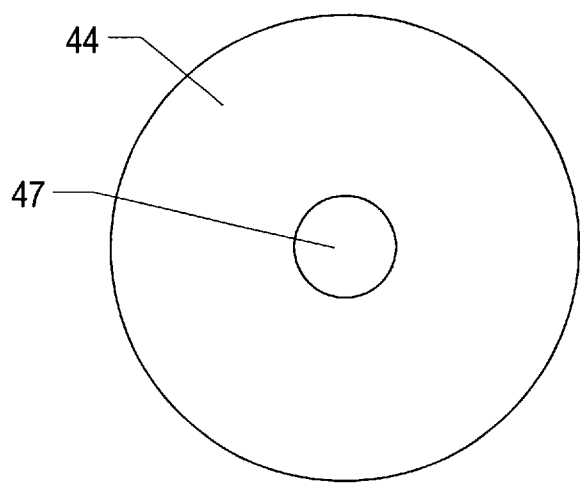
FIG. 13 is a top view of a sealing disc design in accordance with the invention.
Figure 14:
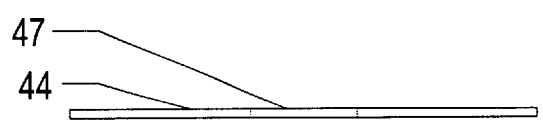
FIG. 14 is a side view of the sealing disc shown in FIG. 13.

Between relief disk 46 and piston 20 is a sealing disk 44. Sealing disk 44 is shown in FIGS. 13 and 14 and exhibits a hole 47 that also accommodates piston channel 28. Sealing disk 44 may comprise, but is not limited to, a Buna-N copolymer with 40 durometer hardness. Sealing disk 44 is sandwiched between piston 20 and relief disk 46 by a force provided by conical spring 40. Sealing disk 44 seals holes 52 in piston 20. When a sufficient predetermined force is applied to sealing disk 44 from inside body 4, the force of conical spring 40 may be overcome and allow for fluid communication between fluid passageway 6 and relief flow passageway 13.

Body 4 exhibits opposing internal walls 54 and 56, which are parts of fluid flow passageway 6. First ends 58 and 60 of internal walls 54 and 56, respectively, provide a limit to the travel of piston 20 within body 4. In FIG. 1, piston 20 is in the full-open position with guide/stop legs 21 abutting angled wall 62 of bonnet 8. Piston 20 may also travel between the position shown in FIG. 1 and a position in which the piston abuts ends 58 and 60, closing off fluid communication between inlet 14 and outlet 16 of fluid flow passageway 6. A biasing member, for example coiled compression spring 64 extending between piston 20 and body 4, biases piston 20 to a open position as described above with guide/stop legs 21E of piston 20 abutting angled wall 62 of bonnet 8. Pressure, positive or negative, transmitted from, for example, the crankcase or vacuum source (not shown) may overcome the force supplied by coiled compression spring 64 to move piston 20 to the position shown in FIG. 1, or to any position in between the closed position and the full open position of FIG. 1. Rolling diaphragm 10 seals the annulus between piston 20 and either bonnet 8 (in the full open position as shown in FIG. 1) or body 4 (in the closed position), or both bonnet 8 and body 4.

The operation of pressure regulating valve 2 is described as follows. Pressure-regulating valve 2 may be positioned, for example, in a diesel engine comprising a closed crankcase (not shown). As the diesel engine runs some blow-by will occur and inherently cause the pressure in the closed crankcase to increase. It is desirable to keep the pressure in the crankcase regulated for reasons discussed in the background section. As the force on the piston 20 due to crankcase pressure and coiled compression spring 64 varies relative to the force on piston 20 due to the vacuum source, piston 20 travels advantageously toward either bonnet 8 or ends 58 and 60 of body 4. When this occurs a gap 66 between ends 58 and 60 and piston 20 changes accordingly and regulates the flow past flow shaper 24 and through fluid passageway 6, thus regulating the crankcase pressure. Thus, piston 20 adjusts itself relative to the forces applied to it, by crankcase pressure, vacuum source, and coiled compression spring 64, to maintain a substantially constant pressure in the crankcase. In the event that the crankcase pressure exceeds the range under which pressure-regulating valve 2 is intended to operate, integral relief valve 22 opens, i.e. fluid communication between fluid flow passageway 6 and relief flow passageway 13 is established through holes 52 of piston 20. The seal between holes 52 and sealing disk 44 breaks as pressure on the piston increases sufficiently to overcome the force on relief disk 46 provided by conical spring 40.

Figure 3:
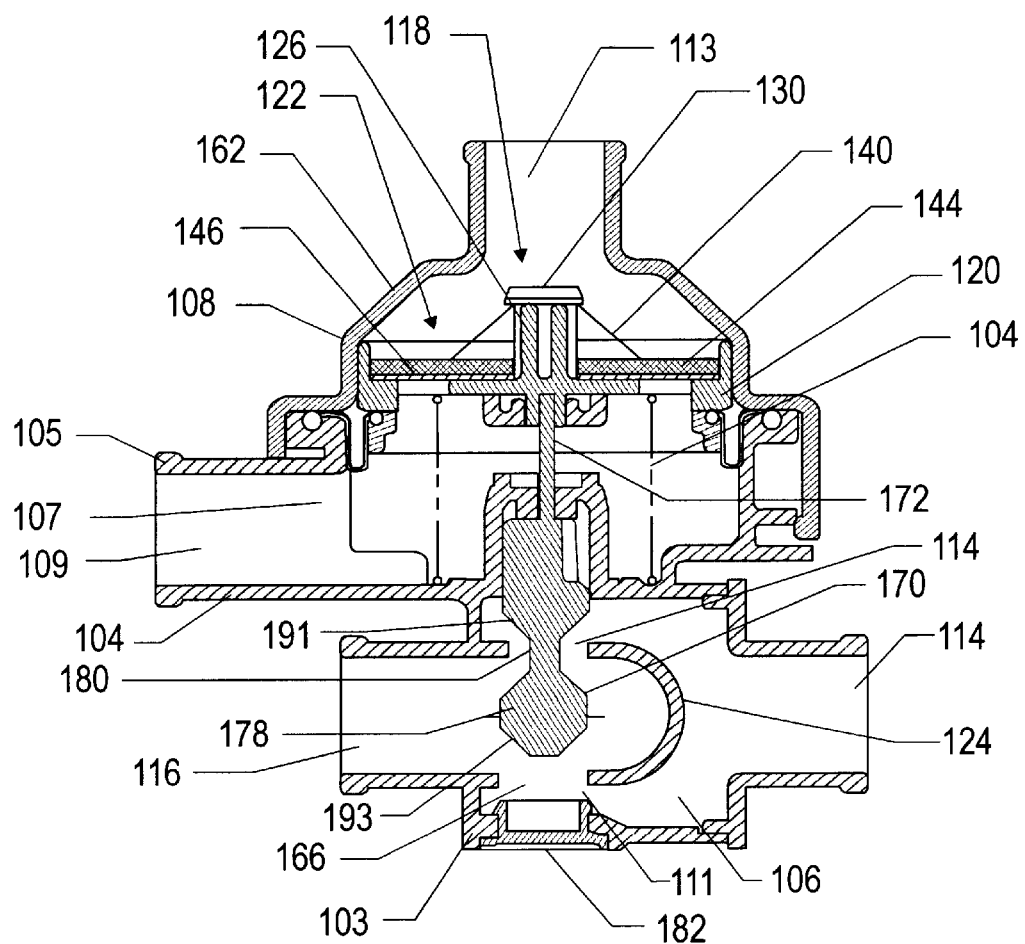
FIG. 3 is a cross-sectional view of an alternative valve design according to one aspect of the invention.
Figure 4:
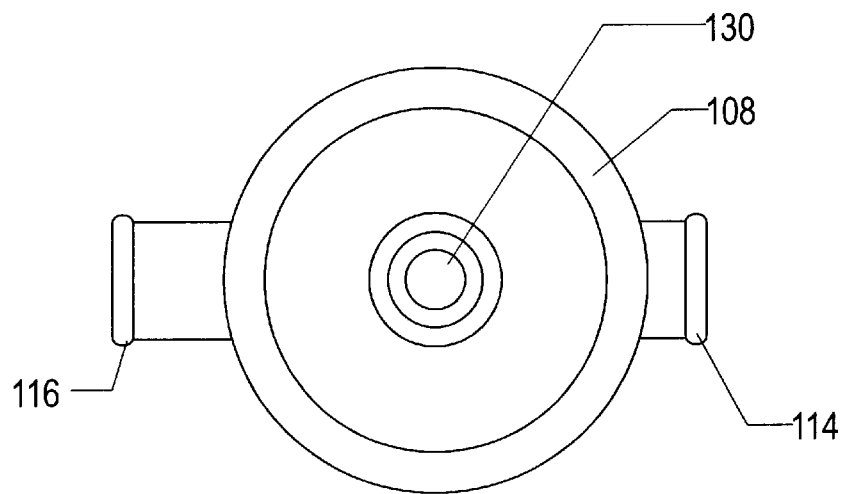
FIG. 4 is a top view of the design according to FIG. 3.
Figure 15:
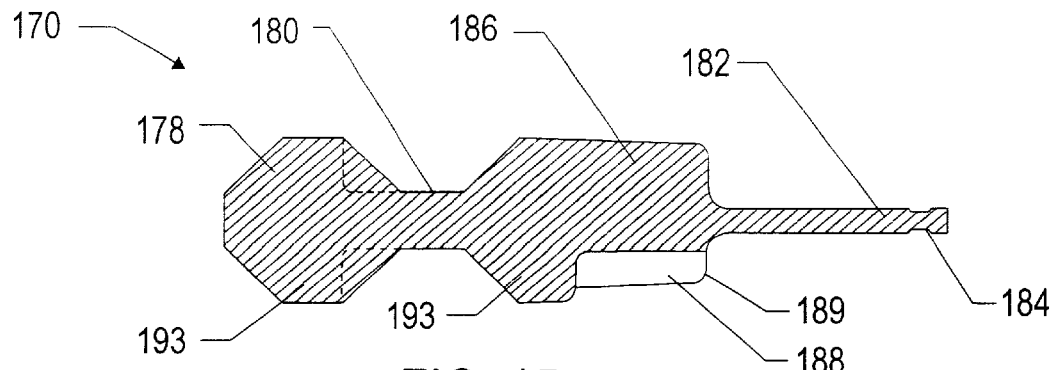
FIG. 15 is a cross-sectional view of a proportioning spool in accordance with the invention.

A second embodiment of the invention is similarly disclosed in FIGS. 3, 4 and 15. In the embodiment shown in these figures, all of the components shown in FIG. 1 are included in pressure-regulating valve 102, however, this second embodiment includes some modifications. Body 104 of pressure-regulating valve 102 includes an upper portion 105 and a lower portion 103. Lower portion 103 includes a fluid passageway 106 with an inlet 114 and outlet 116 substantially parallel to one another. Fluid passageway 106 may facilitate, for example, fluid communication between a crankcase (not shown) and a vacuum source (not shown). It will be understood by one of skill in the art with the benefit of this disclosure that the arrangement of the inlet and outlet may be adjusted as necessary to fit within the engine parameters. Upper portion 105 includes a fluid passageway 107 with an inlet 109. Inlet 109 may facilitate, for example, fluid communication between a crankcase and fluid passageway 107. A flow shaper 124 is included in lower body 103 to reduce turbulent flow characteristics. In the embodiment shown in FIG. 3, flow shaper 124 is generally U-shaped, but it may also be straight or otherwise adjusted. There is no need for an additional flow shaper to be added to piston 120. This absence of an additional flow shaper can be tolerated because in the embodiment shown in FIGS. 3, 4, and 15, there is no fluid communication between the upper portion 105 and the lower portion 103, as there may be for the embodiment shown in FIG. 1. In this embodiment proportioning spool 170 in the lower body 103, may take the place of flow shaper 24 of valve 2 shown in FIG. 1.

Pressure regulating valve 102 as shown in FIG. 3 also includes a proportioning spool 170 that attaches at a first end 172 to piston 120 and extends through upper body 105 and into lower body 103, where it passes through flow orifices 111 and 115 which separate inlet 114 from outlet 116. As proportioning spool 170 travels with piston assembly 118, the flow orifices 111 and 115 open and close. Proportioning spool 170 is shown in detail in FIG. 15 and includes a stem 182 with a groove 184 to facilitate attachment of first end 172 to piston 120. The main body 186 of proportioning spool 170 may exhibit a slot or slots 188 to reduce mass. In some embodiments, there are four fins 189 that keep wall thickness uniform for molding and thus reduce the mass of proportioning spool 170. Main body 186 may exhibit a channel 180 to allow fluid communication between inlet 114 and outlet 116 and to connect the tapered areas 191 and 193 of the proportioning spool 170. Proportioning spool 170 may exhibit tapered areas 191 and 193 to regulate the amount of flow passing through orifices 111 and 115.

Referring again to FIG. 3, an O-ring 174 held in place by an O-ring retainer 176 seals the annulus between proportioning spool 170 and upper body 105. A gap 166 between a second end 168 of proportioning spool 170 and a flow orifice 111 disposed in lower body 103 allows for maximum fluid flow through fluid passageway 106 in the full open position shown in FIG. 3. Coiled compression spring 164 biases piston 120 and thus proportioning spool 170 to the open position shown with tapered areas 191 and 193 of proportioning spool 170 in a position which allows maximum fluid flow through flow orifices 111 and 115 and thus passageway 106.

The piston 120, diaphragm 110, relief valve assembly 122 and other components of pressure regulating valve 102 are identical to the corresponding components described for pressure regulating valve 2.

Figure 16:
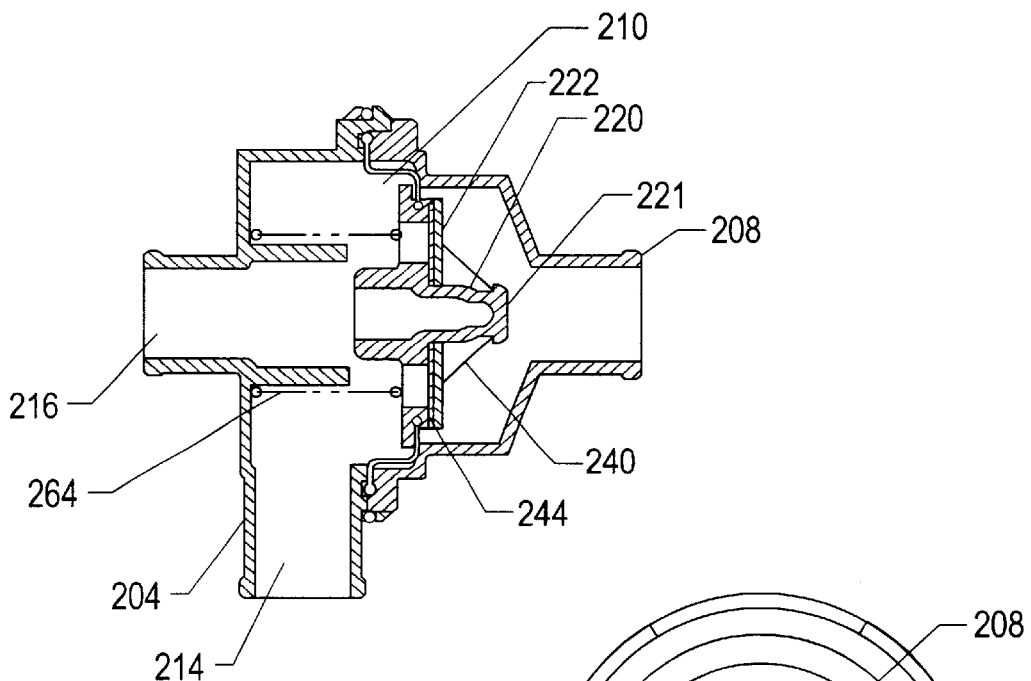
FIG. 16 is a cross-sectional view of an alternative embodiment for the valve in accordance with the invention.
Figure 17:
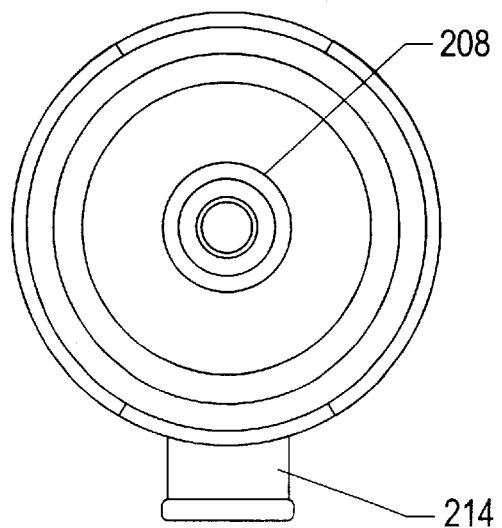
FIG. 17 is a top view of the valve shown in FIG. 16.

Operation of pressure regulating valve 102 is as follows. During engine operation, as crankcase and vacuum source pressure varies, the force on piston 120 correspondingly varies, this varying force is balanced by coiled compression spring 164 which exerts a force equal in magnitude but opposite in direction to the force created by the crankcase and vacuum source pressure. As this occurs, piston 120 and proportioning spool 170 which is rigidly attached thereto advantageously position to increase or decrease the flow orifice 111 and 115 areas, thus increasing or decreasing the fluid flow through fluid flow passageway 106. The increased or decreased flow through fluid passageway 106 results in a regulated crankcase pressure. Piston 120 and thus proportioning spool 170 will self-adjust according to crankcase pressure, vacuum source pressure and the force supplied by coiled compression spring 164 to maintain a substantially constant pressure in the crankcase. In the event of crankcase pressure exceeding the range pressure regulating valve 102 is intended to operate under, integral relief valve assembly 122 advantageously opens, i.e. fluid communication between fluid flow passageway 107 and relief flow passageway 113 is established through holes 152 of piston 120. The seal between holes 152 and sealing disk 144 breaks as pressure on the piston increases sufficiently to overcome the force on relief disk 146 provided by conical spring 140. p In an alternative embodiment shown in FIGS. 16–17, piston 220 does not include a separate insertable plug or flow shaper but instead comprises a single piece. Piston 220 includes a head 221 at first end 238 where it meets conical spring 240 and an integral flow shaper 224 at second end 205. This alternative embodiment does not include the optional flow shapers of the other embodiments, but otherwise, the components, including the operation of relief valve 222, are identical to the embodiment shown in FIG. 1.

In some applications, the pressures at which pistons 20, 120, and 220 are operable are as follows. Pistons 20, 120, and 220 may be biased in the open positions shown in the figures at atmospheric pressure, and may close proportionally at a pressure differential of approximately two to 10 inches of water. As crankcase pressure tends to increase, pistons 20/120/220 will open until the full open position (shown) is reached at a pressure of approximately ten inches of water. At any pressures greater than ten inches of water, relief valves 22/122/222 open and release the excess crankcase pressure. It will be understood by one of skill in the art with the benefit of this disclosure, however, that these pressure ranges are only exemplary, and that the springs and valves may be designed to meet any other pressure ranges as necessary.

While the present invention has been particularly shown and described with reference to a particular illustrative embodiment thereof, it will be understood by those skilled in the art that various changes in form and details may be made without departing from the spirit and scope of the invention. The above-described embodiment is intended to be merely illustrative, and should not be considered as limiting the scope of the present invention.

What is claimed is:

1. A pressure-regulating valve comprising:
   a body with a fluid passageway therethrough;
   a movable piston disposed within the body and movable in response to pressures thereon to adjust a fluid flow through the fluid passageway; and
   a relief valve integral to the piston, wherein at least one hole in the piston is exposed to a relief passageway upon the application of a predetermined level of pressure on the piston.

2. The pressure-regulating valve of claim 1, further comprising a bonnet coupled to the body with the relief fluid passageway therein.

3. The pressure-regulating valve of claim 1, wherein movement of the moveable piston regulates pressure by allowing varying volumes of fluid to pass through the fluid passageway.

4. The pressure-regulating valve of claim 1, further comprising a flow shaper attached to the piston to alter flow through the fluid passageway.

5. The pressure-regulating valve of claim 1, wherein the relief valve comprises:
   a plug disposed within a channel of the piston;
   a sealing disc adjacent to the at least one hole in a piston;
   a relief disc adjacent to the sealing disc; and
   a relief valve spring disposed between the plug and the relief disc and biasing the relief disc and the sealing disc to a closed, sealed position covering the at least one hole in the piston.

6. The pressure-regulating valve of claim 1, further comprising at least one biasing member between the piston and the body, the at least one biasing member biasing the piston to an open position.

7. The pressure-regulating valve of claim 2, further comprising a seal between the bonnet and the body.

8. The pressure-regulating valve of claim 7, wherein the seal comprises a rolling diaphragm.

9. The pressure regulating valve of claim 1, wherein the internal combustion engine is a diesel engine.

* * * * *

UNITED STATES PATENT AND TRADEMARK OFFICE
CERTIFICATE OF CORRECTION

PATENT NO. : 6,553,979 B2
DATED : April 29, 2003
INVENTOR(S) : Albright

It is certified that error appears in the above-identified patent and that said Letters Patent is hereby corrected as shown below:

Column 6,
Line 27, please insert -- used to regulate crankcase pressure in an internal combustion engine -- after "valve".
Line 49, please replace "a" with -- the -- before the word "piston".

Signed and Sealed this

Twenty-first Day of October, 2003

JAMES E. ROGAN
*Director of the United States Patent and Trademark Office*